United States Patent [19]

Bennett

[11] Patent Number: 5,694,614

[45] Date of Patent: Dec. 2, 1997

[54] MINIMUM LATENCY BUS INTERFACE CIRCUIT WITH REDUCED I/O PIN COUNT THROUGH MULTI-MODE OPERATION

[75] Inventor: Brian R. Bennett, Laguna Niguel, Calif.

[73] Assignee: AST Research, Inc., Irvine, Calif.

[21] Appl. No.: 848,985

[22] Filed: Apr. 30, 1997

Related U.S. Application Data

[63] Continuation of Ser. No. 390,747, Feb. 15, 1995, abandoned.

[51] Int. Cl.[6] ................................................. G06F 13/00
[52] U.S. Cl. ....................... 395/800; 395/309; 395/550; 364/232.8; 364/240.5; 364/271.5; 364/DIG. 1
[58] Field of Search .................................. 395/840, 851, 395/853, 878, 287, 305, 306, 309, 444, 550, 800

[56] References Cited

U.S. PATENT DOCUMENTS

| | | | |
|---|---|---|---|
| 4,519,034 | 5/1985 | Smith et al. | 395/550 |
| 4,888,684 | 12/1989 | Lilja et al. | 395/289 |
| 5,101,347 | 3/1992 | Balakrishman et al. | 395/800 |
| 5,191,653 | 3/1993 | Banks et al. | 395/293 |
| 5,285,323 | 2/1994 | Hetherington | 395/449 |
| 5,371,863 | 12/1994 | Silver | 395/308 |
| 5,392,422 | 2/1995 | Hoel et al. | 395/550 |
| 5,479,647 | 12/1995 | Harness et al. | 395/550 |

*Primary Examiner*—Alpesh M. Shah
*Attorney, Agent, or Firm*—Knobbe, Martens, Olson & Bear, LLP

[57] ABSTRACT

A method and apparatus for interfacing multiple integrated circuit chip devices to a system bus includes higher speed portions of a circuit within a primary IC chip and lower speed portions of a circuit within a secondary IC chip. The primary IC chip connects directly to the system bus while the secondary IC chip receives the same bus signals via the primary IC chip after a one clock cycle delay. Both the primary and secondary IC chips are capable of driving signals out onto the system bus when the primary and secondary ICs are part of a bus master circuit. When the primary and secondary ICs act as bus masters, signals are received by the secondary IC chip in the same clock cycle as the primary IC chip receives the signals. Thus, the secondary IC includes a state machine to indicate if the received signals are delayed by one clock cycle or not. In a preferred embodiment, the same pins are used by the primary IC to drive signals through to the secondary IC as to drive signals out onto the system bus.

2 Claims, 6 Drawing Sheets

MINIMUM LATENCY BUS INTERFACE CIRCUIT WITH REDUCED I/O PIN COUNT THROUGH MULTI-MODE OPERATION

This application is a continuation of U.S. patent application No. 08/390,747, filed Feb. 15, 1995, now abandoned.

BACKGROUND OF THE INVENTION

1. Field of the Invention

The present invention relates to an apparatus and method for connecting circuitry to a system bus, and in particular, for connecting multiple integrated circuit chips to a high speed signal bus.

2. Description of the Related Art

With the advent of information processing systems including high speed system buses, increasing attention must be paid to design constraint factors such as circuits which interface with the system bus. Quite often, multiple integrated circuit (IC) chips are necessary to implement increasingly complex logic to receive signals from and transfer signals to the system bus. In systems having multiple IC chips interfaced with the system bus, a number of significant limitations are often observed. For instance, due to physical constraints, such as the size of the IC chips and the location of other circuitry proximate to the system bus, it is not always possible to place all of the logic which is in communication with the system bus proximate to the system bus.

Often a single logic circuit (such as a bus controller circuit) designed to operate as an integrated whole must be implemented within two or more physically separate IC chips. Thus, in some cases, a first IC containing a first portion of the logic circuit will be proximate to the bus and receive signals immediately from the bus (since the signal line length is relatively short between the IC and the system bus), while a second IC which contains another portion of the logic circuit will be located some physical distance from the system bus such that a relatively long signal line length is provided to the additional logic within the second IC chip. Such an embodiment is often disadvantageous for two reasons. First, because the second IC chip is not located proximate to the system bus, the signal length necessary to connect from the system bus to the secondary logic must be longer than the length needed to connect the primary chip. This longer etch can cause distortion of the signals on the system bus due to "transmission line effects," commonly referred to as signal "reflections." That is, depending upon the bus speed, this "stub length becomes a critical design parameter which can degrade the signal quality and impact the speed at which the bus can run. (If the signal reflections affect signal quality too severely, more time must be allowed before the signal can be accurately sampled, thus forcing the bus to run at a slower speed). For instance, if only a single connection were needed to the first IC chip, the "stub length," that is the length of the etch needed to connect the system bus to the first IC, can be relatively short (e.g., 0.25 inches to 1.0 inches). If it is also necessary for this stub to be connected to another IC, the stub length must be increased (e.g., on the order of 1.0 inches to 2.0 inches). A stub length that is tolerable is dependent upon the bus speed, overall system bus length, and other parameters such as logic levels.

A second difficulty typically encountered when multiple IC chips are required to be interfaced with the system bus is that a double signal load is placed on the system bus. The double load may cause significant power loss to the signals propagated along the system bus. Thus, signals propagating along a system bus having too high of a load may not reach the appropriate voltage levels to indicate a clear distinction between an asserted and unasserted signal. This could lead to system errors in data, address and control processing capabilities.

Several methods have been employed in the past to overcome the above-mentioned disadvantages when multiple IC chips are interfaced with the system bus. For example, one solution is simply to incorporate all of the logic into a single monolithic device. This eliminates the need to pass any signals from one device to another and provides a single load on the system bus. However, to incorporate all of the logic into a single monolithic device may be quite expensive or technologically unfeasible so that such an implementation is not available for many information processing system manufacturers.

Another solution is simply to run the system bus at a slower speed so that multiple loads on the signal bus do not cause the problems associated with delayed propagation. This solution may work because the clock cycles on the system bus are considerably longer to ensure that each of the devices interface with the system bus receive logic signals within the same clock cycle. However, this has the obvious disadvantage of slowing down the information processing system which degrades the overall system performance.

Yet another solution contemplates latching the signals from the system bus before the signals are presented to any onboard logic. The latched signal is then propagated to the onboard logic within the multiple IC chips within essentially the same clock cycle. Because the signal latching device acts as a repeater circuit, this method allows a single load to be placed on the system bus, and also alleviates difficulty with differences between signal line length since the signal latch circuit may be placed at some intermediate position between the multiple IC chips. However, in such an implementation, all of the onboard logic must operate from a signal which has a one clock delay relative to the system bus signal. This delay may impair system performance, particularly in cases where high speed logic is adapted to respond immediately to bus instructions.

Another solution which has been contemplated for solving the disadvantages of connecting multiple IC chips to a system bus involves buffering data from the system bus rather than latching the signals within a register circuit. The buffer then acts as a repeater circuit which propagates the signals to the multiple IC chips containing the onboard logic so that the system bus sees only one load. However, such an embodiment adds a delay of the buffer into the signal path, which is often on the order of 3–4 nanoseconds. Often, this delay is large enough that the signal is not usable within the same (i.e., a single) clock cycle. Certain specialized and complicated circuitry may, of course, be used to compensate for the added delay of the buffer; however, such circuitry is often costly and adds overcomplexity to the system.

Currently, several vendors are offering a single monolithic chip solution that connects directly to a PCI bus (i.e., SCSI and LAN chips). As these devices mature and more functionality is added to these initial product offerings, there will be a need to efficiently connect these primary bus device chips to secondary devices for functions such as memory buffering, redundancy, expanded functionality, etc. Vendors who can do this most efficiently will have a performance advantage over their competitors.

SUMMARY OF THE INVENTION

A circuit for connection to a system bus within an information processing system, wherein the circuit operates as an integrated whole while being physically implemented within separate integrated circuit chips, comprises a primary integrated circuit chip which connects to the system bus. The primary integrated circuit chip includes only higher speed portions of the circuit. The primary integrated circuit chip further includes buffering and delay logic which propagates signals from the system bus through the primary integrated circuit chip with at least one clock cycle delay. The circuit of the present invention also comprises a secondary integrated circuit chip in communication with the system bus via the buffering and delay logic of the primary integrated circuit chip and via signal transfer lines which extend between the primary and secondary circuit chip. The secondary integrated circuit chip primarily includes lower speed portions of the circuit.

According to a further aspect of the invention, the secondary circuit further includes a state machine which determines if signals from the primary integrated circuit chip are delayed by one or more clock cycles.

In a preferred embodiment, the signal transfer lines provide for propagation of signals from the primary circuit to the secondary circuit as well as allowing either the primary or secondary circuit to drive signals out to the system bus.

In still another preferred embodiment, the primary and secondary circuits are implemented within a central processing unit (CPU) module having a local CPU. In a particularly preferred embodiment, the primary circuit chip includes a state machine detector for determining if the local CPU is initiating a data transfer onto the system bus, and, in response thereto, causing signals transferred from the primary circuit to the secondary circuit to be substantially simultaneous with signals transferred from the primary circuit to the system bus. According to a further preferred aspect, the secondary circuit includes a state machine which determines if signals from the primary integrated circuit chip are delayed by one or more clock cycles.

Under another aspect, the present invention is a method of interfacing multiple integrated circuit chips with a bus in an information processing system. The method comprises the steps of dividing a circuit into primary and secondary integrated circuit chips wherein higher speed portions of the circuit are contained within the primary integrated circuit chip and lower speed portions of the circuit are contained within the secondary integrated circuit chip; and propagating signals from the system bus through the primary integrated circuit chip to the secondary integrated circuit chip with at least one clock cycle delay.

Under yet a further aspect, the present invention is a method of interfacing multiple integrated circuit chips with a bus in an information processing system, wherein the integrated circuit chips are implemented within a central processing unit (CPU) module having a local CPU. The method comprises the steps of dividing a single circuit into primary and secondary integrated circuit chips wherein higher speed portions of the circuit are contained within the primary integrated circuit chip and lower speed portions of the circuit are contained within the secondary integrated circuit chip; and propagating signals from the system bus through the primary integrated circuit chip to the secondary integrated circuit chip.

In a preferred embodiment, the method further comprises the steps of determining if a data transfer onto the system bus is initiated by the local CPU; and if it is determined that the local CPU is initiating a data transfer onto the system bus, propagating signals from the primary circuit to the secondary circuit without delay, while if it is determined that the local CPU is not initiating a data transfer onto the system bus, propagating signals from the primary circuit to the secondary circuit with at least one clock cycle delay.

According to a still further aspect, the present invention comprises a circuit for connection to a system bus within an information processing system. The circuit operates as a single integrated circuit while being physically implemented within separate integrated circuit chips. The circuit is further implemented within a central processing unit (CPU) module having a local CPU. The circuit comprises a primary integrated circuit chip which connects to the system bus and to the local CPU. The primary integrated circuit chip includes predominantly high speed portions of the circuit. The primary integrated circuit chip includes buffer and delay logic which propagates signals from the system bus through the primary integrated circuit chip with at least one clock cycle delay. The primary integrated circuit chip further includes a detection circuit which detects whether the local CPU has initiated a data transfer to the system bus and which causes the signals propagated from the primary integrated circuit chip to be propagated without delay when the local CPU has initiated a data transfer to the system bus. The circuit further comprises a secondary integrated circuit chip in communication with the local CPU, and also in communication with the system bus via the buffer and delay logic of the primary integrated circuit chip and signal transfer lines which extend between the primary and secondary circuit chip. The secondary integrated circuit chip primarily includes lower speed portions of the circuit. The secondary integrated circuit chip further includes a state machine circuit which determines whether signals propagated from the primary circuit to the secondary circuit are delayed.

DESCRIPTION OF THE PREFERRED EMBODIMENTS

Figure 1:
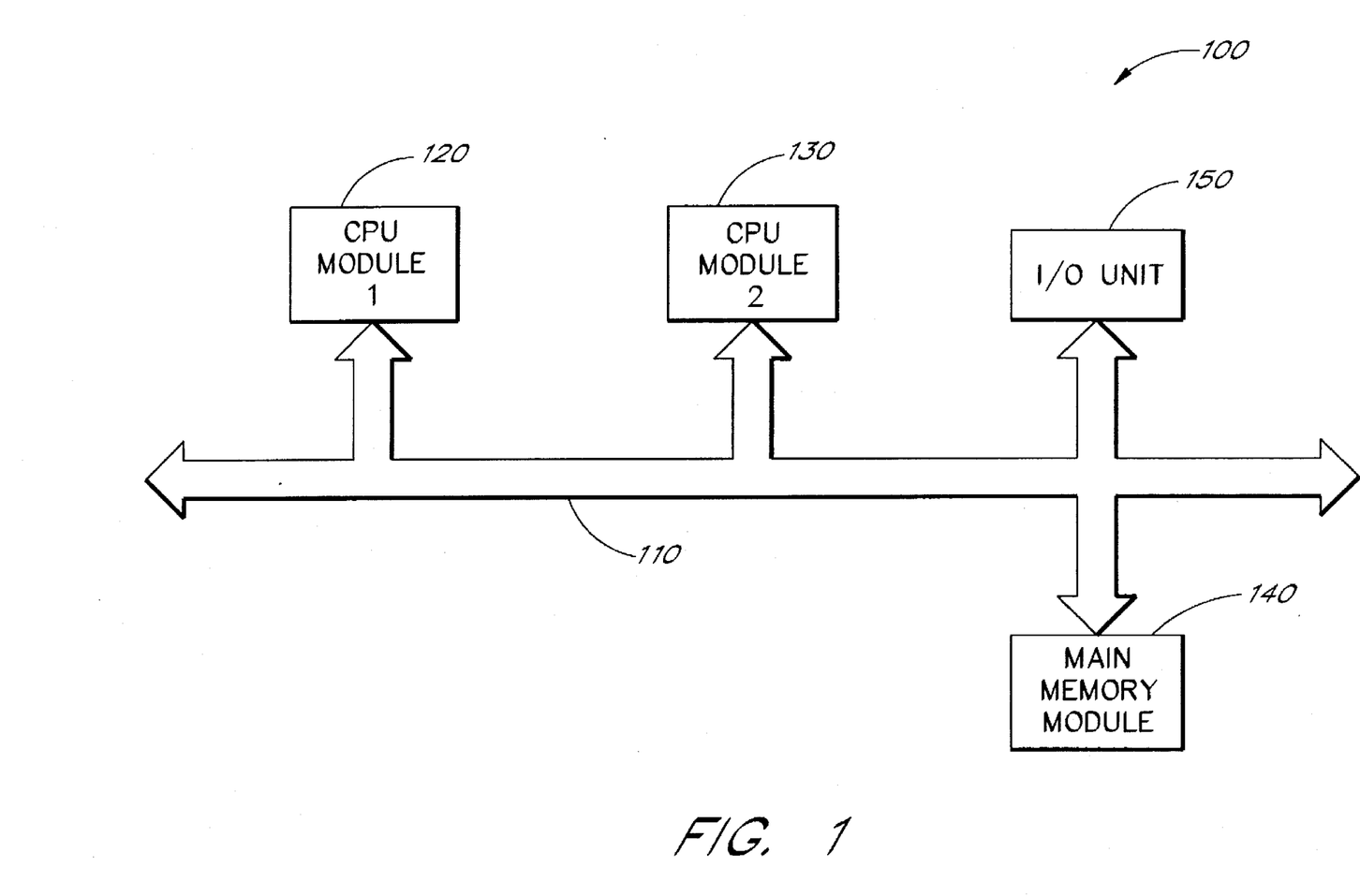
FIG. 1 is a schematic block diagram illustrating a multiprocessor system including a high speed system bus.

FIG. 1 illustrates a schematic block diagram of a multiprocessor system 100 including a high speed system bus 110 which may, for example, comprise a PCI bus, that connects to first and second central processing unit (CPU) modules 120, 130, respectively. The system bus 110 further connects to a main memory module 140, as well as an input/output (I/O) unit 150.

In operation, the first and second CPU modules 120, 130 communicate with the main memory module 140 and the I/O unit 150. Typically, the CPU modules 120, 130 issue commands to the main memory module 140, as well as to the I/O unit 150, and also read and write data from and to the main memory modules 140 and the I/O unit 150. The I/O unit 150 further is able to access the main memory module 140 to write data thereto and read data therefrom. It should be understood that although the present invention is described as being implemented within a multi-processor system, which is more likely to include a high speed system bus (e.g., on the order of 25 megahertz or higher), it should be understood that the present invention need not be implemented within a multi-processor system such as the multi-processor system 100 depicted within FIG. 1.

Figure 2:
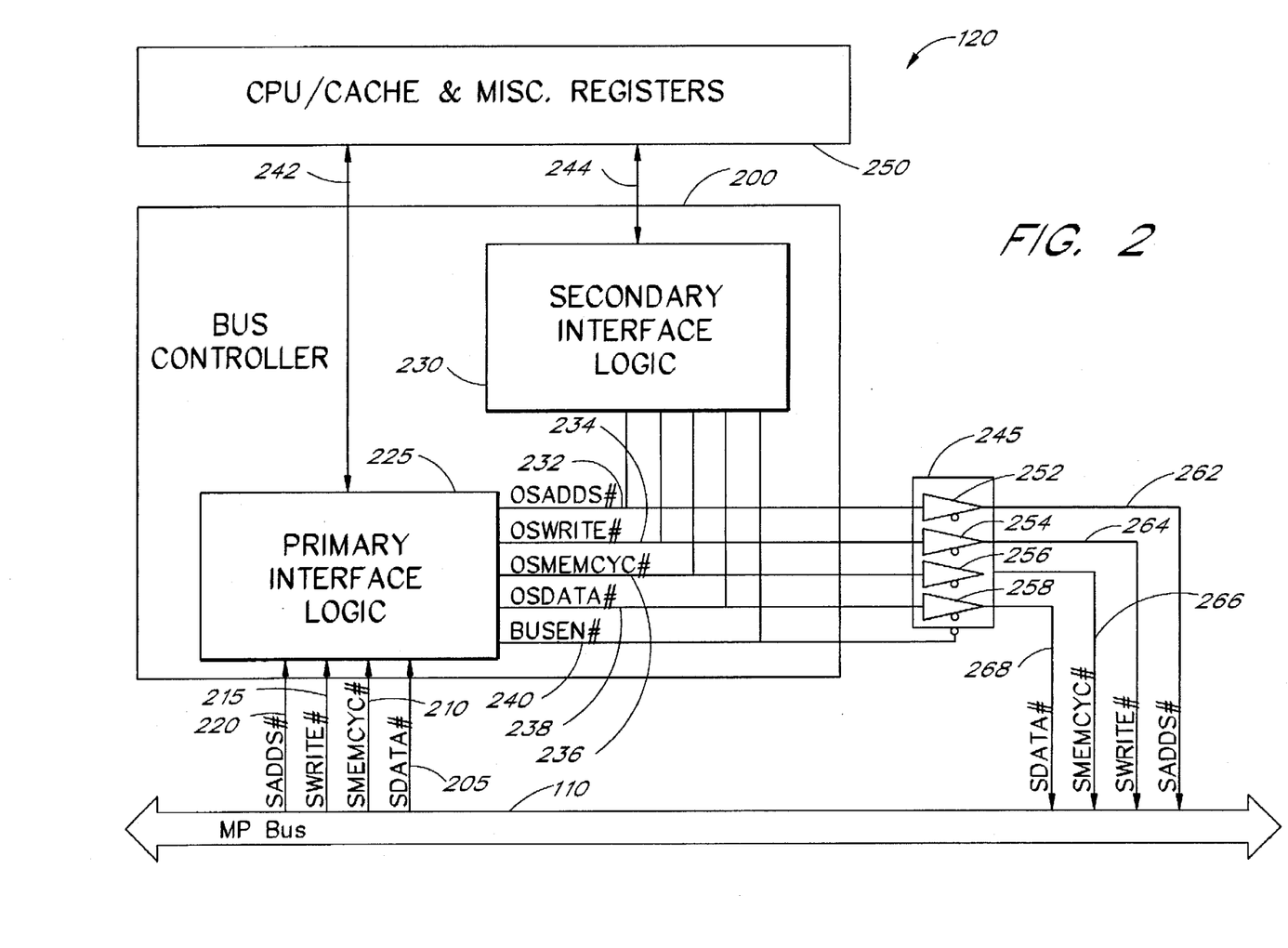
FIG. 2 is a schematic block diagram representing the main structural and functional elements contained within one of the central processing unit modules connected to the high speed system bus of FIG. 1.

FIG. 2 is a schematic block diagram which represents some of the main structural and functional internal elements within the CPU module 120. For purposes of the present description, the CPU module 120 should be considered as substantially identical to the CPU module 130 so that any description of the CPU module 120 may be understood to apply equally to the CPU module 130. Of course, it should be understood that it is not necessary to implement the present invention in every device within the multi-processor system 100 because the advantages of the present invention may be obtained, in part, by implementing the present invention in only one device.

The system bus 110 communicates with a bus controller 200 within the CPU module 120 via an input data strobe line 205, a memory cycle input line 210, a write input line 215, and an address strobe input line 220. The lines 205, 210, 215 and 220 serve as inputs to a primary interface logic circuit 225 contained within a single IC chip. The primary interface logic IC chip 225 communicates with a secondary interface logic chip 230 via an internal address strobe line 232, an internal write line 234, an internal memory cycle line 236, and an internal data strobe line 238. In addition, the primary interface logic 225 communicates a bus enable signal via a line 240 to the secondary interface logic 230. As illustrated in FIG. 2, the primary interface logic IC chip 225 is located proximate to the system bus 110 while the secondary interface logic IC 230 is located farther from the system bus 110 than the primary interface logic IC chip 225.

The primary interface logic circuit 225 and the secondary interface logic IC 230 communicate with a CPU, a cache memory, and other miscellaneous registers, which are generally designated by a block 250, via bidirectional signal buses 242, 244, respectively.

The lines 232, 234, 236, 238 and 240 serve as inputs to a tri-state transceiver circuit 245. Specifically, the internal address strobe line 232 provides an input to a first tri-state transceiver 252 within the transceiver circuit 245, while the internal write line and system memory cycle lines 234, 236, respectively, serve as inputs to second and third tri-state transceivers 254, 256. Furthermore, the internal data strobe line 238 serves as an input to a fourth tri-state transceiver 258. All of the transceivers 252-258 are enabled to pass data to respective outputs 262-268 by means of a control signal provided on the bus enable line 240. The output lines 262-268 transmit signals from the CPU module 120 to the system bus 110.

Both the primary interface logic circuit 225 and the secondary interface logic 230 comprise individual IC chips which may, in one embodiment, comprise field programmable gate arrays (FPGAs) available from Altera, and sold under the model number EPM7160. In accordance with the teachings of the present invention, the primary interface logic IC 225 contains the high speed logic for the bus controller 220, such as the snoop control circuitry which performs high speed operations such as snooping the cache within the processor 250. The secondary interface logic IC 230 contains lower speed logic, such as interrupt control, which performs operations such as handling interrupts.

In operation, data, address and control signals to be transferred to the first CPU module 120 from the system bus 110 are provided to the primary interface logic 225 within the bus controller 200 via the signal lines 205-220. High speed logic circuitry within the primary interface logic circuit 225 receives these signals within the same clock cycle as they are asserted by the bus system 110 on the inputs 205-220. Thus, the high speed logic within the primary interface logic IC 225 is able to provide control signals to the CPU, cache, and miscellaneous registers 250 via the bus 242 immediately.

As depicted within FIG. 2, because the bus controller 200 includes logic circuitry within two separate IC chips 225, 230, the primary interface logic IC 225 passes on signals necessary for the operation of the bus controller 200 to the secondary interface logic IC 230. These signals are passed along with a one clock cycle delay via the internal lines 232-238. In addition, a bus enable signal, which serves as a control signal, is supplied to the secondary interface logic 230 from the primary interface logic IC 225 via the line 240. Furthermore, the primary interface logic IC 225 acts as a repeater circuit so that only a single load is placed on the system bus 110 when the primary and secondary interface logic 225, 230 are connected as depicted in FIG. 2.

Because the secondary interface logic 230 includes the lower speed logic circuitry, the one clock cycle delay does not significantly impair the performance of the processing and control within the secondary interface logic IC 230. The control signals which enter the secondary interface logic 230 are simply delayed by one clock cycle, which causes a corresponding delay in the outputs from the secondary interface logic 230. This delay in the outputs of the secondary interface logic 230 does not significantly impair performance of the overall system since the control signals generated by the secondary interface logic 230 are low priority signals which need not be immediately asserted to insure proper operation of the processing system 100. The secondary interface logic IC 230 passes control signals to the CPU, cache and miscellaneous registers 250 via the bus 244.

The CPU module 120 may also act as a bus master, so that the bus controller 200 acts to issue control signals onto the system bus 110. In this case, it is not necessary for the communication signals between the primary and secondary interface logic ICs 225, 230 to be delayed by one clock cycle because the signals are simultaneously provided to the primary and secondary ICs 225, 230 from the CPU, cache and registers 250. Thus, the bus enable signal is asserted over the line 240 by the primary interface logic 225 to indicate to the secondary interface logic 230 that the data signals on the lines 232-238 are not delayed by one clock cycle relative to the reception of those same signals within the primary interface logic 225. As will be described in greater detail below with reference to FIGS. 3-6, the secondary interface logic 230 includes circuitry for controlling the operation of the secondary interface logic 230 for the cases where there is a one clock cycle delay and no delay.

The bus enable signal asserted via the line 240 also enables the tri-state transceivers 252-258 within the transceiver circuit 245 so that data on the lines 232-238 are output to the system bus 110 over the transceiver outputs 262–268. Thus, a further advantage of the present invention is apparent. Namely, because the same lines 232–238 are used both to drive data from the system bus 110 through to the secondary interface logic IC chip 230 and to drive data out from the primary and secondary interface logic ICs 225, 230, the same pins on the primary and secondary interface logic IC chips 225, 230 perform double duty. This saves pin connections on the FPGAs used to implement the primary and secondary interface logic 225, 230.

Figure 3:
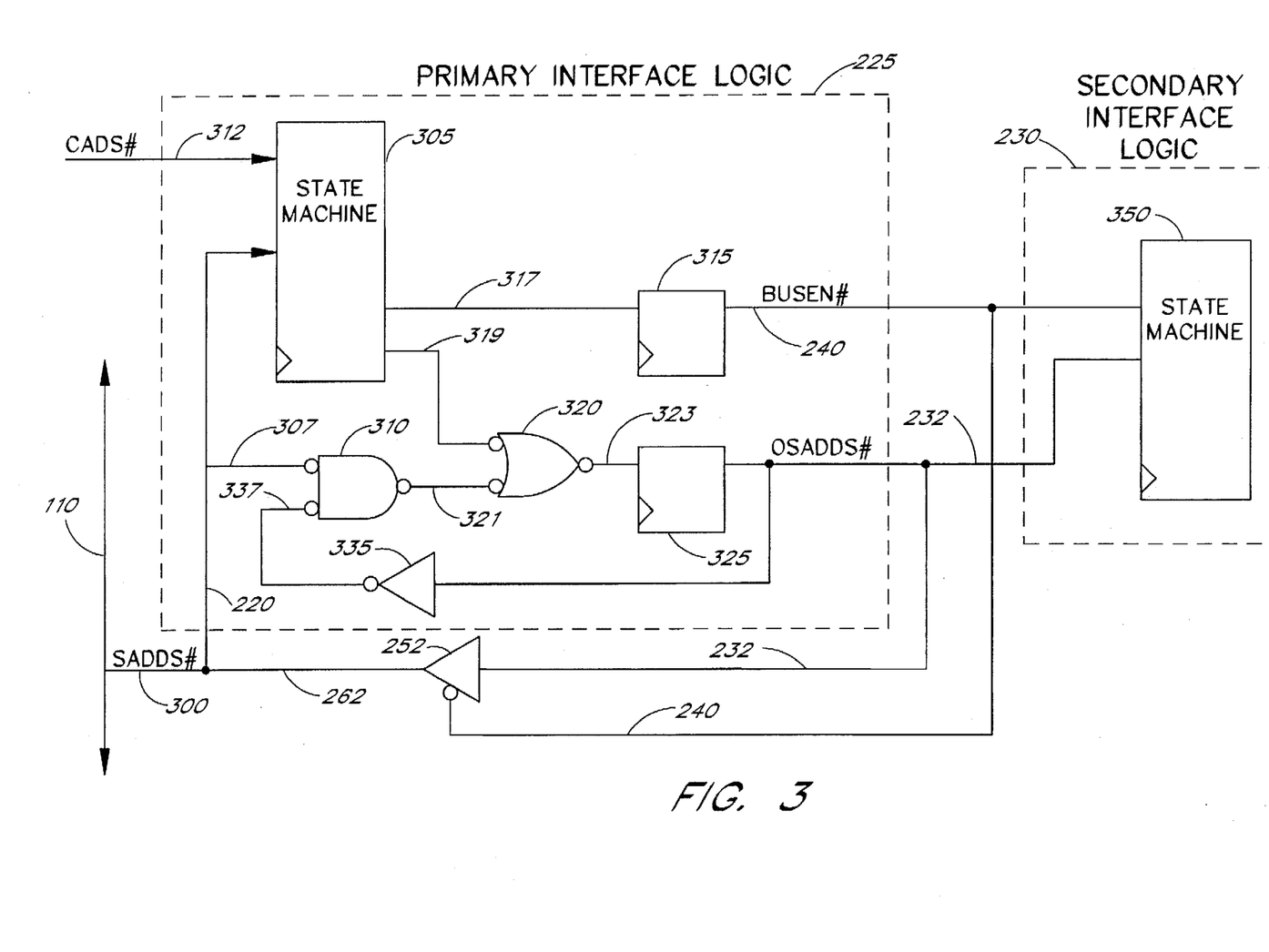
FIG. 3 is a schematic block diagram showing the main internal logic elements used within first and second IC chips to interface the primary IC chip with the secondary IC chip.

FIG. 3 is a schematic block diagram showing the logic circuitry internal to the primary interface logic 225 and the secondary interface logic IC 230 to drive (i.e., propagate) signals from the primary interface logic IC 225 to the secondary interface logic IC 230. It should be understood that, for purposes of simplicity, and to prevent repetitiveness of the description of the present invention, FIG. 3 depicts the logic circuitry used for propagating only the address strobe signal via the address strobe line 232 from the primary interface logic IC 225 to the secondary interface logic IC 230. It will be understood, however, that substantially identical circuits are used to propagate the data strobe, write and memory cycle signals from the primary interface logic IC 225 to the secondary interface logic IC 230.

As illustrated in FIG. 3, the system bus 110 communicates with the primary interface logic IC 225 and the secondary interface logic IC 230 via a bidirectional address strobe bus 300 which comprises the address strobe line 220 that provides inputs to the primary interface logic IC 225 and the output address strobe line 262 which provides outputs from the primary and secondary interface logic ICs 225, 230, respectively. The address strobe line 220 which serves as an input to the primary interface logic IC 225 connects to a state machine 305 as well as to a first active low input 307 of a NAND gate 310. The state machine 305 further receives a cacheable address strobe signal input via a line 312, which is one of the lines which connects to the primary interface logic 225 via the bus 242. The state machine 305 provides outputs to a delay latch circuit 315 via a line 317 and to a NOR gate 320 via a first active low input 319 of the NOR gate 320. A second active low input 321 of the NOR gate 320 is provided from the output of the NAND gate 310. An active low output 323 of the NOR gate 320 is provided as an input to a delay latch circuit 325 having an output connected to the internal address strobe line 232. In one embodiment, the latch circuit 325 comprises a D flip-flop that introduces a one clock cycle delay between the application of the signal at the input and the propagation of the signal at the output of the latch circuit 325. The internal address strobe line 232 connects to an inverter 335 which in turn connects to an active low input 337 of the NAND gate 310.

The internal address strobe line 232 is provided as an input to a state machine 350 within the secondary interface logic 230. The output of the delay latch circuit 315 is also provided as an input to the state machine 350 via the bus enable line 240. As will be described in greater detail below with reference to FIG. 4, the state machine 350 within the secondary interface logic IC 230 is used to determine whether or not the signals passed from the primary interface logic 225 are delayed by one clock cycle or have the same timing as the signals received by the primary interface logic IC 225.

The internal address strobe line 232 is also provided as an input to the tri-state transceiver 252. The output line 262 of the transceiver 252 connects to the system bus 110. The tri-state transceiver 252 is enabled to pass data from the input line 232 to the output 262 when the bus enable signal is asserted via the line 240.

In operation, when a device other than the local CPU is the bus master, the address strobe signal is provided as an input to the state machine 305 via the line 220. The state machine 305 does not generate a bus enable signal over the line 317 to the latch circuit 315. Furthermore, the state machine 305 does not assert a signal over the line 319 to the first input of the NOR gate 320.

The second input 321 to the NOR gate 320 is asserted by the output of the NAND gate 310 because the NAND gate 310 has the input 307 asserted and the input 337 asserted (via the inverting buffer 335). The logic circuit defined by the NAND gate 310, the NOR gate 320, the delay latch 325 and the feedback inverting buffer 335 is employed to prevent an address strobe signal of more than one clock cycle from being output to the state machine 350 of the secondary interface logic IC 230. This is important when the local CPU places an address onto the system bus 110 because the system address strobe signal transmitted via the transceiver 252 would otherwise remain low for more than one clock pulse and would disrupt the flow of control signals on the system bus 110.

Because the NAND gate 310 is an active low logic gate, the NAND gate 310 outputs a low signal on the line 321 when low signals are asserted at both active low inputs 307, 337. The NAND gate 310 outputs a high signal for any other input combination on the lines 307, 337. Likewise, because the NOR gate 320 is an active low logic gate, the NOR gate 320 will output a low signal on the line 323 whenever a low signal is asserted on either of the active low input lines 319, 321. The NOR gate 320 will output a high signal when high signals are applied to both of the inputs 319, 321.

Assuming this is the first cycle in which the address strobe signal is asserted, the output of the latch circuit 325 has an unasserted address strobe signal corresponding to a high logic level because the address strobe signal is active low. This high logic level is inverted within the buffer 335 so that effectively a low logic level signal is applied at the second active low input 337 of the NAND gate 310. When the active low address strobe signal is asserted on the first input line 307 of the NAND gate 310, this means that low logic level signals are applied at both inputs of the NAND gate 310 so that a low logic level signal is asserted on the output 321 of the NAND gate 310.

Thus, in the first clock cycle that an address strobe signal is asserted, the output of the NAND gate 310 will be a low logic level signal. Thus, since a low logic level signal is applied at the active low input 321 of the NOR gate 320, a low logic level signal will be output by the NOR gate 320 onto the line 323.

The low logic level signal is then latched into the latch 325 at the occurrence of the next clock pulse. Thus, on the subsequent clock pulse, the low logic level signal is output along the line 232 so that the internal address strobe signal is asserted. Thus, the state machine 350 within the secondary interface logic IC 230 receives an active address strobe signal via the line 232 while the input of the inverter 335 also receives an active address strobe signal (i.e., a low logic level signal). Thus, the inverter 335 propagates a high logic level signal to the active low input 337 of the NAND gate 310. Thus, a high logic level signal is output on the line 321 even if the address strobe signal remains asserted as a low logic level signal on the input line 307. The high logic level signal output on the line 321, together with a high logic level signal applied on the line 319 by the state machine 305, causes a high logic level to be output on the line 323. This high logic level signal is latched into the latch 325 and is output in the next clock cycle so that a high logic level signal is present on the line 232. Because the address strobe signal is active low, a high logic level signal indicates that the address strobe signal is no longer asserted on the line 232. Thus, the NAND gate 310, the NOR gate 320, the latch circuit 325 and the inverter 335 act in conjunction to ensure that the address strobe signal is not asserted at the input of the state machine 350, or on the system bus 110, for more than one clock cycle.

Because the local CPU is not the bus master, the state machine 305 does not assert the bus enable signal so that the state machine 350 within the secondary interface logic 230 interprets the incoming signals as signals which are delayed by one clock cycle.

When the local CPU is the bus master, a cacheable address strobe signal is transmitted to the state machine 305 from the CPU, cache, and registers 250 via the line 312. The assertion of the cacheable address strobe signal on the line 312 causes the state machine 305 to assert the bus enable signal over the line 317 at the input of the latch circuit 315. The latch circuit 315, which, in one embodiment, comprises a D flip-flop, delays the bus enable signal for exactly one clock cycle and passes the delayed bus enable signal out to the secondary logic IC 230 via the line 240. The state machine 305 further generates a second signal which serves as an input to the NOR gate 320 on the line 319. The NOR gate 320 therefore asserts an active low signal over the line 323 at the input of the flip-flop circuit 325. Thus, within the next clock cycle, the internal address strobe signal is asserted over the line 232, while the bus enable signal is asserted over the line 240. This causes two operations to occur. First, the system address strobe signal is asserted on the system bus 110 via the transceiver 252. Second, the state machine 350 is informed that the incoming signals are not delayed. That is, as noted above, the state machine 350 within the secondary interface logic 230 determines whether or not the address strobe signal (or equivalently, the data strobe signal, the memory cycle signal, or the write signal) are delayed by one clock cycle or are within the same clock cycle as the corresponding signals within the primary interface logic IC 225. This determination is based upon the status of the signals on the input lines 240, 232.

Figure 4:
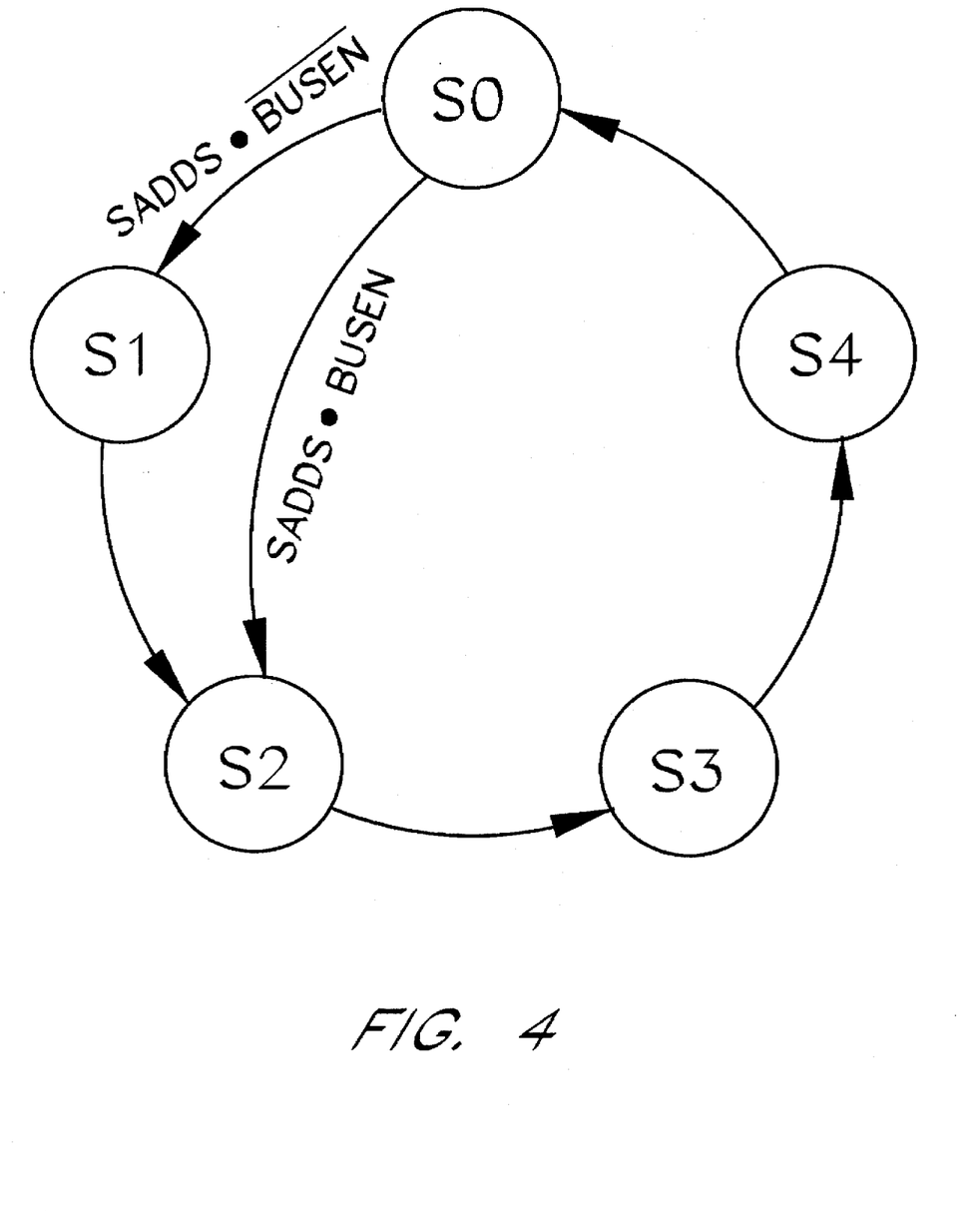
FIG. 4 is a state diagram representing the state transitions of an internal state machine within the secondary interface logic of FIG. 3.
Figure 5:
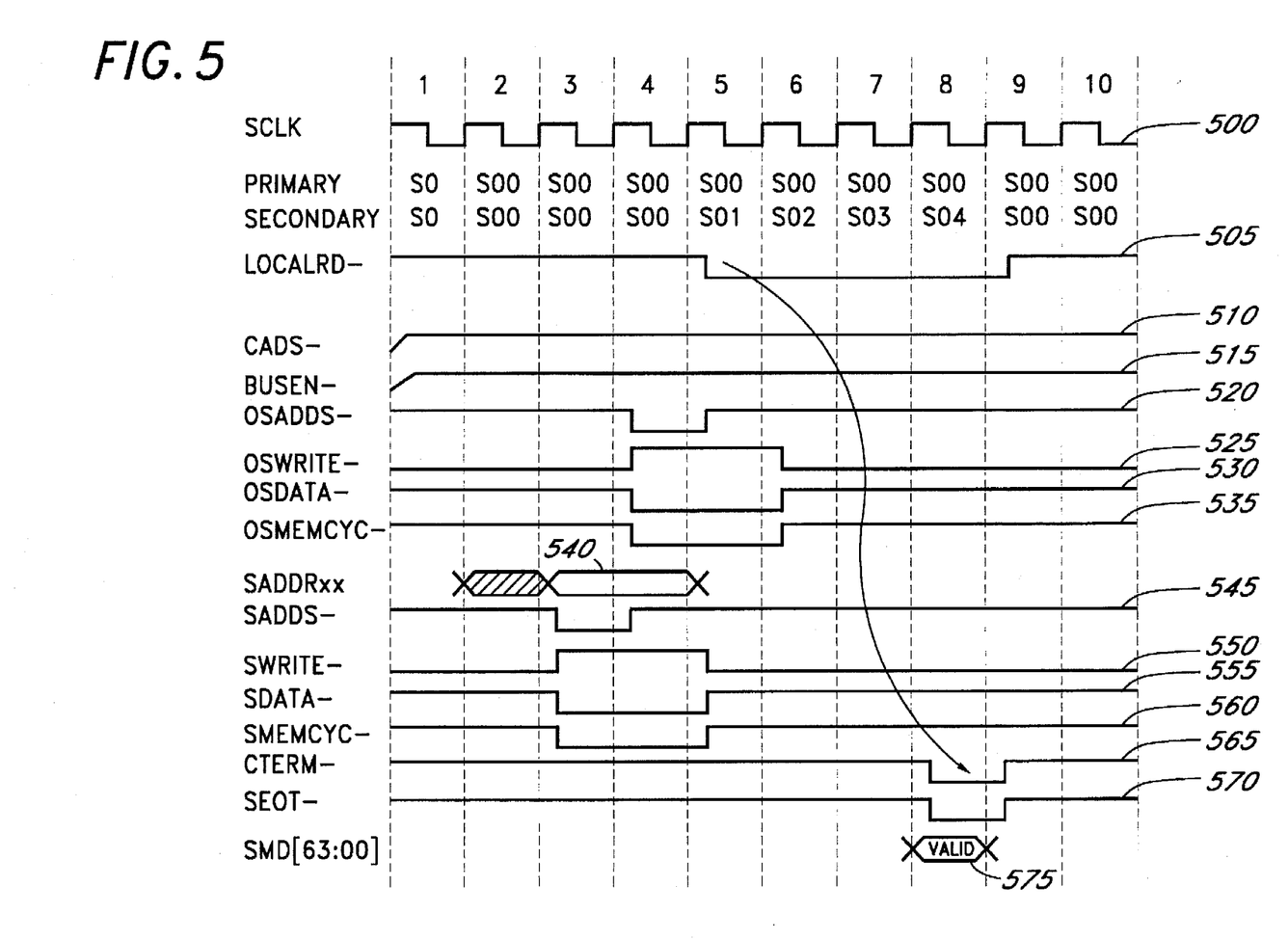
FIG. 5 is a timing diagram which illustrates the timing of signals which relate to the operation of state machines within the primary and secondary interface logic of FIG. 3 for the case when a device other than the local CPU acts as a bus master.
Figure 6:
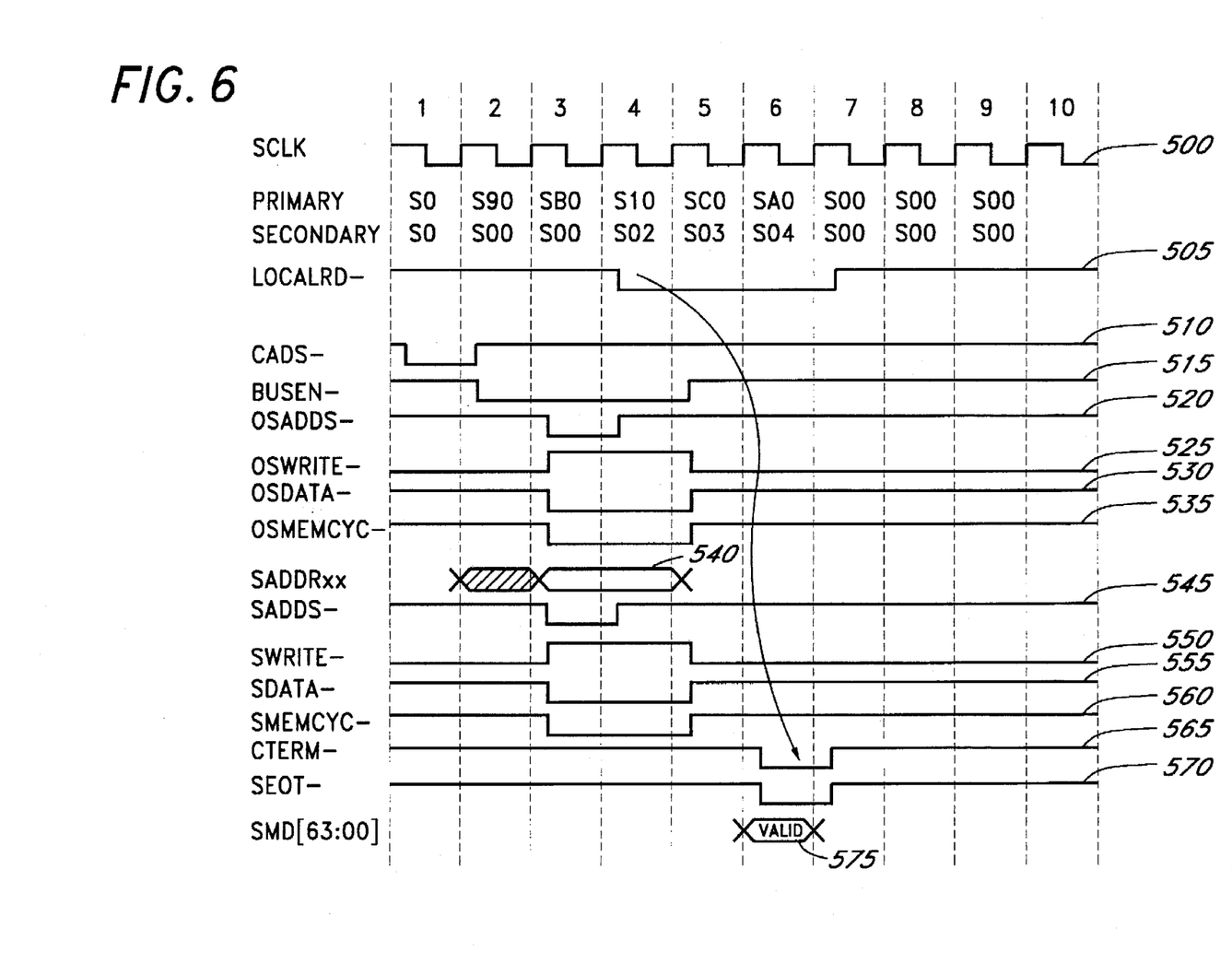
FIG. 6 is a timing diagram which illustrates the timing of signals which relate to the operation of the state machines within the primary and secondary interface logic of FIG. 3 for the case when the local CPU acts as the bus master.

FIGS. 4-6 together illustrate the overall operation of the state machines 305, 350 in conjunction with the primary and secondary interface logic circuits 225, 230. FIG. 4 is a state diagram which indicates the operation of the state machine 350 as determined by the inputs along the lines 232, 240. FIGS. 5 and 6 are timing diagrams which illustrate the timing of signals which relate to the operation of the state machines 305, 350 when a device other than the local CPU 250 acts as a bus master and when the local CPU 250 acts as the bus master, respectively.

As illustrated in FIGS. 5 and 6, a system clock signal (SCLK) 500 provides timing for the multiprocessor system 100. Beneath the system clock signal 500, the respective states of the primary and secondary state machines 305, 350 are represented. A local read signal (LOCALRD) 505 indicates that data is to be read from a local device such as an EPROM or register (not shown) within the CPU module 120. The assertion of the cacheable address strobe signal (CADS) 510 on the line 312 indicates that the local CPU has placed valid data on the local address bus (not shown) within the CPU module 120. The assertion of the bus enable signal (BUSEN) 515 on the line 240 enables the CPU module 120 to pass signals to the system bus 110. The internal address strobe signal (OSADDS) 520 is asserted on the line 232 to indicate to the secondary interface logic 230 that an address is to be strobed into or out of the CPU module 120. The internal write signal (OSWRITE) 525 is asserted over the line 234 to indicate to the secondary interface logic 230 whether the current bus transaction is a write transaction or a read transaction. The internal data strobe signal (OSDATA) 530 is asserted over the line 236 to indicate to the secondary interface logic 230 whether the current transaction is a data or instruction fetch cycle. The internal memory cycle signal (OSMEMCYC) 535 is asserted over the line 238 to indicate to the secondary interface logic 230 whether the current bus transaction is a memory cycle or an I/O cycle. The system address signal (SADDRxx) 540 is the valid address on the system bus 110. The system address strobe signal (SADDS) 545 is asserted on the line 300 to indicate that a valid address is present on the system bus 110. A system write signal (SWRITE) 550 is asserted over the line 215 to indicate whether the current bus cycle is a write transaction or a read transaction. The system input data strobe signal (SDATA) 555 is asserted over the line 205 to indicate whether the current transaction is a data cycle or an instruction fetch cycle. The system memory cycle signal (SMEMCYC) 560 is asserted over the line 210 to indicate whether the current transaction is a memory cycle or an I/O transaction. An active cycle terminate signal (CTERM) 565 indicates that data is valid on the system bus 110, while an active system end of transaction signal (SEOT) 570 indicates that the transaction cycle is complete. Finally, an active system data signal (SMD) 575 indicates that valid data is present on the system bus 110. It should be noted that unless otherwise stated, all of the signals depicted in the timing diagrams of FIGS. 5 and 6 are active low signals, as indicated by a "—" following the signal name.

As shown in FIGS. 4 and 5, the state machine 350 remains in an idle state S0 until the internal address strobe signal (OSADDS) 520 (shown in FIGS. 5 and 6) is asserted. Under the assumption that the local CPU is not the bus master, the internal address strobe signal (OSADDS) 520 is asserted one clock cycle after valid address data has been placed onto the system bus 110 (i.e., one clock cycle after the assertion of the system address strobe signal (SADDS) 545 (shown in FIGS. 5 and 6). Of course, it will be appreciated that the system write signal (SWRITE) 580, the system data signal (SDATA), 555, and the system memory cycle signal (SMEMCYC) 560 are also asserted with the system address strobe signal 545 on the system bus 110. As indicated above, these signals are provided as input to enter logic similar to the logic shown for the system address strobe signal 545 depicted in FIG. 3. The primary interface logic 225 delays the system address strobe signal (SADDS) 545 by one clock cycle, as described above with reference to FIG. 3, to produce the internal address strobe signal 520. Once the internal address strobe signal 520 is asserted, and the bus enable signal (BUSEN) 515 (shown in FIGS. 5 and 6) remains unasserted, the state machine 350 transitions from the state S0 to a state S1 (see FIG. 4) indicating that the address strobe signal 520 is delayed by one clock cycle. The internal write signal (OSWRITE) 525, the internal data signal (OSDATA) 535, and the internal memory cycle signal (OSMEMCYC) 535 are also asserted after a one cycle delay with the internal address strobe signal 520.

Once the state machine 350 transitions from the state S0 to the state S1, the local read signal (LOCALRD) 505 (shown in FIGS. 5 and 6) is asserted. The local read signal (LOCALRD) 505 is asserted until the state machine 350 transitions through the states S2, S3, and S4 (i.e., for four clock cycles), whereupon valid data is presented to the local CPU when the state machine 350 reaches the state S4 (clock cycle 8 in FIG. 5). Within the same clock cycle, the system end of transaction signal (SEOT-) 570 and the terminate cycle signal (CTERM-) 565 are also asserted, in response to the assertion of the local read signal 505, to indicate the end of the cycle. In this manner, control signals sent to the secondary interface logic 230 are propagated with a single clock cycle delay.

FIG. 6 details the sequence of events when the local CPU 250 acts as the bus master. Because the local CPU is acting as a bus master, no system address strobe signal 545 will be asserted over the system bus 110. Thus, the state machine 305 (FIG. 3) monitors the cacheable address strobe signal (CADS) 510 (shown in FIGS. 5 and 6) generated by the CPU 250 and transmitted to the state machine 305 via the line 312. Upon the assertion of the cacheable address strobe signal 510, the state machine 305 asserts the signal line 319 so as to cause the OSADDS signal 520 to be asserted in the next clock cycle. When the bus enable signal 515 is asserted and the OSADDS signal 520 is also asserted, this indicates that the local CPU is the bus master so that the state machine 350 transitions immediately from the state S0 to the state S2 (FIG. 4) indicating that the address strobe signal 520 is not delayed by one clock cycle.

In the same clock cycle in which the OSADDS signal 520 is asserted, the SADDS signal 545 is also asserted over the system bus 110 through the transceiver 252. Furthermore, upon the transition of the state machine 350 from the state S0 to the state S2, the local read signal (LOCALRD) 505 is asserted and held until the state machine 350 transitions from state S4 to state S0, whereupon the local read signal 505 is unasserted. Valid data is placed onto the system bus 110 by the local CPU when the state machine 350 reaches the state S4 (clock cycle 6 in FIG. 6). Within the same clock cycle, the system end of transaction signal 570 and the terminate cycle signal 565 are also asserted, in response to the assertion of the local read signal 505, to indicate the end of the cycle. Note that since the state machine 350 transitions only through three states (rather than through four states as in the case when there is a one clock cycle delay), the local read signal 505 is asserted for one less clock cycle, and the valid data is presented to the system bus without any delay due to the secondary interface logic 230. In this manner, control signals sent to the secondary interface logic 230 are propagated without delay.

Although the preferred embodiment of the present invention has been described and illustrated above, those skilled in the art will appreciate that various changes and modifications to the present invention do not depart from the spirit of the invention. For example, as will be appreciated by one of skill in the art, three or more integrated circuit chips could be connected in the manner described above with the first chip propagating signals to a second chip having slower logic and the second chip propagating signals to a third chip having even slower logic, etc. Furthermore, if the primary interface logic is capable of driving the system bus without the aid of external transceiver drivers such as the drivers 245, these drivers may simply be incorporated as an output portion of the primary interface logic. Accordingly, the scope of the present invention is limited only by the scope of the following appended claims.

I claim:

1. A method of interfacing multiple integrated circuit chips with a system bus in an information processing system, said system bus operating at a system bus data rate, wherein said integrated circuit chips are implemented within a central processing unit (CPU) module having a local CPU, said method comprising the steps of:

dividing a single circuit into primary and secondary integrated circuit chips wherein higher speed portions of said circuit are contained within said primary integrated circuit chip and lower speed portions of said circuit are contained within said secondary integrated circuit chip;

propagating signals from said system bus through said primary integrated circuit chip to said secondary integrated circuit chip at said system bus data rate;

determining if a data transfer onto said system bus is initiated by said local CPU; and if it is determined that said local CPU is initiating a data transfer onto said system bus, propagating signals from said primary circuit to said secondary circuit without delay, while if it is determined that said local CPU is not initiating a data transfer onto said system bus, propagating signals from said primary circuit to said secondary circuit with at least one clock cycle delay, said secondary circuit receiving said signals at said system bus data rate irrespective of whether said signals are delayed by one clock cycle.

2. A circuit for connection to a system bus within an information processing system, wherein said circuit operates as a single integrated circuit while being physically implemented within separate integrated circuit chips, said circuit further being implemented within a central processing unit (CPU) module having a local CPU, said system bus operating at a system bus data rate, said circuit comprising:

a primary integrated circuit chip which connects to said system bus and to said local CPU, said primary integrated circuit chip including predominantly high speed portions of said circuit, said primary integrated circuit chip including buffer and delay logic which propagates signals from said system bus through said primary integrated circuit chip with at least one clock cycle delay, said primary integrated circuit chip further including a detection circuit which detects whether said local CPU has initiated a data transfer to said system bus and which causes said signals propagated from said primary integrated circuit chip to be propagated without delay when said local CPU has initiated a data transfer to said system bus; and a secondary integrated circuit chip in communication with said local CPU, and also in communication with said system bus via said buffer and delay logic of said primary integrated circuit chip and signal transfer lines which extend between said primary and secondary integrated circuit chips, said secondary integrated circuit chip primarily including lower speed portions of said circuit, said secondary integrated circuit chip further including a state machine circuit which determines whether signals propagated from said primary integrated circuit chill to said secondary integrated circuit chip are delayed, said second integrated circuit chip receiving said signals from said primary integrated circuit chip at said system bus data rate irrespective of whether said signals are delayed by said primary integrated circuit chip.

* * * * *

UNITED STATES PATENT AND TRADEMARK OFFICE
CERTIFICATE OF CORRECTION

PATENT NO.   : 5,694,614
DATED        : December 2, 1997
INVENTOR(S)  : Brian R. Bennett It is certified that error appears in the above-identified patent and that said Letters Patent is hereby corrected as shown below:

<u>Column 12,</u>
Line 58, change "circuit chill" to -- circuit chip --.

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*